PHOTOGRAPHIC COATING COMPOSITIONS

Masao Ishihara and Shui Sato, Tokyo, Eiichi Sakamoto, Hanno, and Osakazu Sugino, Tokyo, Japan, assignors to Konishiroku Photo Industry Co., Ltd., Tokyo, Japan
No Drawing. Continuation of application Ser. No. 757,505, Sept. 4, 1968. This application Oct. 13, 1971, Ser. No. 189,036
Int. Cl. B01f 17/00; G03c 1/28, 1/40
U.S. Cl. 96—100       8 Claims

ABSTRACT OF THE DISCLOSURE

A photographic coating aid having the formula $$R-O-CH_2-CH-CH_2-SO_3M$$
$$|$$
$$O-A$$

or $$R-O-CH_2-CH-CH_2-N-CH_2-CH_2-SO_3M$$
$$| \quad\quad\quad\quad |$$
$$O-A \quad\quad\quad B$$

wherein R is a hydrocarbon radical having 4–18 carbon atoms or a phenyl group having a $C_{4-18}$ hydrocarbon radical, A is hydrogen or a lower acyl group, B is hydrogen or methyl and M is a cation, is incorporated into a photographic coating composition in an amount of 0.01 to 20 g./kg. of composition.

---

This application is a Rule 60 continuation of copending parent application Ser. No. 757,505 filed Sept. 4, 1968. The priority of Japanese applications 58,329/1967 filed Sept. 13, 1967, and 58,639/1967 filed Sept. 14, 1967, respectively, is claimed.

This invention relates to a photographic coating composition which comprises as a coating aid a surface active agent of the general formula $$R-O-CH_2-CH-CH_2-SO_3M$$
$$|$$
$$O-A$$

or $$R-O-CH_2-CH-CH_2-N-CH_2-CH_2-SO_3M$$
$$| \quad\quad\quad\quad |$$
$$O-A \quad\quad\quad B$$

in which R is a hydrocarbon radical having 4–18 carbon atoms or a phenyl group containing a $C_{4-18}$ hydrocarbon radical, A is hydrogen or a lower acyl group, B is hydrogen or methyl group and M is a cation e.g. Na, K, $NH_4$, etc. Formation of uniform photographic coatings is an object of the invention.

Photographic light-sensitive materials usually comprise a support such as glass plate, baryta paper, nitrocellulose, acetylcellulose, polycarbonate, etc. and a plurality of layers coated thereon. Among these layers are included subbing layer, light-sensitive emulsion layer, protective layer, filter layer, anti-halation layer, etc. In the routine work of the art, these layers are formed on the film support by applying a coating liquid (solution, emulsion or dispersion) to the support by means of the dipping process, double roller method, slide hopper method and then drying the coating. In this case, it is very essential to apply a variety of coating liquids onto the entire surface of the support at a uniform thickness. In the prior art, however, unevenness arising in the coating direction (referred to as "longitudinal unevenness" or "transverse unevenness") and local imperfection of coating (referred to as "comets") or unevenness at the peripheral zone are occasionally observed. In order to prevent such drawbacks, use of a coating aid, e.g. a surface tension depressant for coating liquids, is well known in the art.

Among the known coating aids, saponin is the most common. Because saponin is a material of the natural origin, however, it is unavoidable that the quality is not settled and different from each batch. Even if the same quality of saponin were used, significant varieties in photographic characteristics and properties as coating aids can be observed.

In place of saponin, use of various synthetic surface active agents has been proposed. However, among known surface active agents, only a very few of them are satisfactory, as they exert an adverse effect on the photographic characteristics, especially degradation of storability at high temperature under high humidity and the coating efficiency thereof in high speed coating is insufficient.

According to this invention, a compound of the aforementioned general formula is incorporated into various photographic coating liquids as a coating aid. Such compound has good surface activity and does not cause any adverse effect on photographic emulsion. Moreover, no variety in quality as observed in the use of saponin is brought about and a small amount of such compound is effective to decrease surface tension of a coating liquid and to reduce contact angle. Viscosity is not increased even by the use of the above compound. Therefore, not only the coating at an ordinary speed but also high speed coating at about 40 m./min. as well as double-layer coating are facilitated without formation of any unevenness and comets to form very uniform coating.

Compared with saponin, the compound No. 2 or No. 19 referred to hereinafter as a compound covered by the afore-mentioned general formula shows the following surface tension and contact angle on being used as the coating liquid:

Measurement of the surface tension was made by means of Du Nauy method by adding the indicated amount of 3%-aqueous solution of the compound No. 2 or No. 19 to the high speed emulsion containing 10% gelatine. The contact angle to the triacetyl cellulose film base subjected to the subbing treatment by means of the alkali saponification (Treatment A) or the subbing treatment with vinyl maleic acid resin (Treatment B) was measured. The results thus obtained are shown in the table below along with the results obtained by using saponin in the similar way. As the control, the emulsion containing no additive was used.

| Additive | Amount (percent) | Surface tension (dyne/cm.) (35° C.) | Contact angle (40° C.) Treatment A (°) | Contact angle (40° C.) Treatment B (°) |
|---|---|---|---|---|
| None | 0 | 55 | 45 | 56 |
| Saponin | 0.08 | 42 | 42 | 41 |
|  | 0.12 | 44 | 41 | 38 |
|  | 0.24 | 40 | 38 | 36 |
| Compound number: |  |  |  |  |
| 2 | 0.03 | 38 | 40 | 37 |
|  | 0.06 | 32 | 33 | 36 |
|  | 0.12 | 30 | 30 | 32 |
|  | 0.24 | 30 | 31 | 32 |
| 19 | 0.03 | 39 | 41 | 39 |
|  | 0.06 | 35 | 39 | 40 |
|  | 0.12 | 33 | 39 | 35 |
|  | 0.24 | 32 | 32 | 31 |

It is apparent from the above table that the surface tension and contact angle are reduced by the compounds used in this invention and rather superior results are obtained by using saponin which has therefore been used conveniently. Thus, according to the invention, uniform coating is available and any adverse effect is not caused on photographic characterics as observed in the case of known synthetic surface active agents being used.

Typical compounds which are usable in the present invention will be illustrated below. However, it should be noted that they are merely illustrative of compounds embraced by the general formula and that the scope of the invention is not limited thereto.

1. 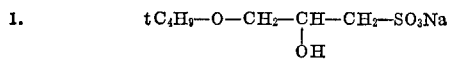

2. 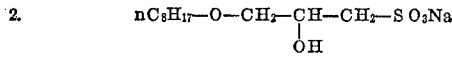

3. 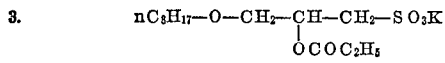

4. 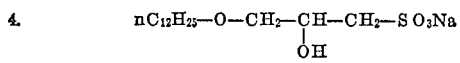

5. 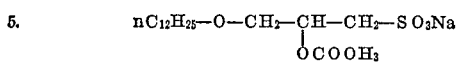

6. 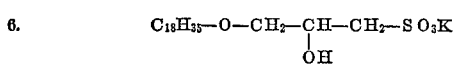

7. 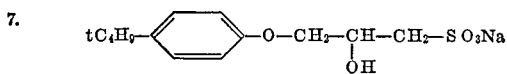

8. 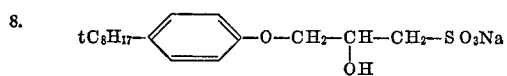

9. 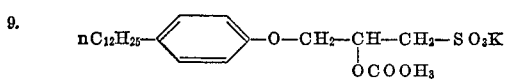

10. 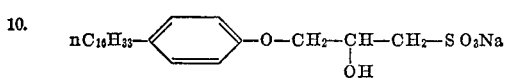

11. 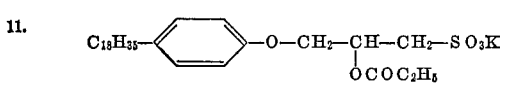

12. 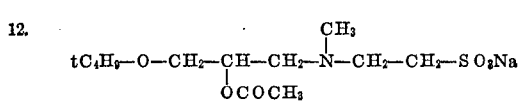

13. 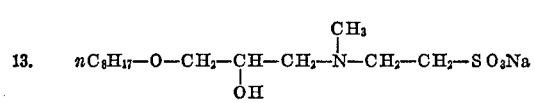

14. 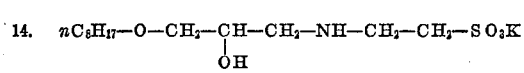

15. 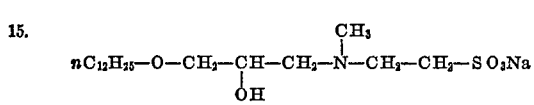

16. 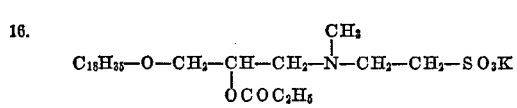

17. 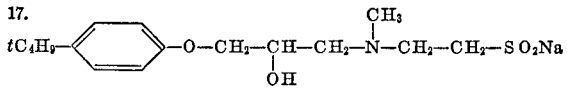

18. 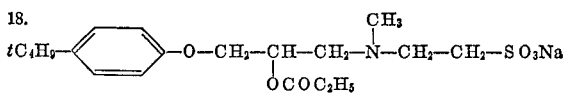

19. 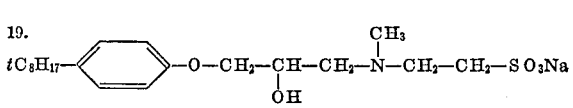

20. 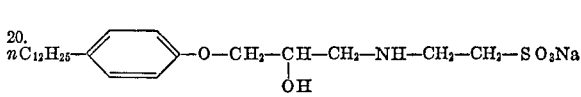

21. 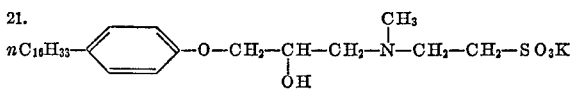

22. 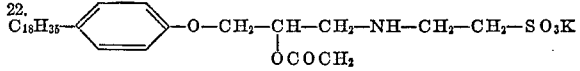

Syntheses of the above compounds are disclosed in Journal of the Chemical Society of Japan (Industrial Chemistry Section), vol. 63, page 595 (1960) and vol. 66, page 215 (1963) and in U.S. Pats. 2,989,547 and 3,084,187.

Such compounds are added to photographic coating liquid as a solution dissolved in water or a water-miscible organic solvent, such as methanol, ethanol, acetone, etc. These compounds are usually satisfactory as a coating aid in an amount of 0.01–20 g. per 1 kg. of various photographic coating liquids. Such amount of the above compounds are used as a dispersion or solution of 1–10% concentration. Such compounds may be employed in combination with other surface active agent.

Incorporation of the above compounds into a light-sensitive photographic emulsion can be made at any stage during the ripening. In general, said compounds are added to the photographic emulsion after the ripening and just before coating. The light-sensitive photographic emulsion used in this invention may be chemically sensitized by way of gold-, sulfur- or polyalkylene oxide-sensitization or optically sensitized by a light-sensitive dye. The emulsion may contain an azaindene stabilizer or a hardener. An emulsion for color film containing a color former may also be useable.

The following examples illustrate the present invention.

EXAMPLE 1

A high speed silver iodobromide emulsion subjected to the secondary ripening was added with an adequate amount of a stabilizer. To each of the emulsion was added the compounds according to this invention as indicated below, or, as control, saponin or a heretofore known synthetic surfactant, p-tert.octylphenyl polyethylene glycol ether sulfonic acid ester sodium salt of the formula

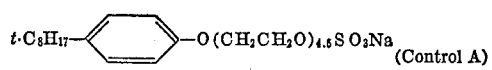
(Control A)

Such emulsions were then coated on subbed (by the alkali saponification) surface of triacetyl cellulose film base by means of the dipping process. Uniformity of coatings and photographic properties of the resulted films were examined. The results thus obtained are shown in Table 1.

TABLE 1

| Compound added | Amount added (percent) | Coating property | Photographic characteristics | | | | | |
|---|---|---|---|---|---|---|---|---|
| | | | Immediately after the preparation of emulsion | | Incubated at 55° C. for 3 days after the preparation | | Incubated at 50° C. and 80% R.H. for 3 days after the preparation | |
| | | | Relative speed | Fog | Relative speed | Fog | Relative speed | Fog |
| None | | Unevenness and repellency observed on all of the surface. | 100 | 0.03 | 101 | 0.04 | 100 | 0.03 |
| Saponin | 0.06 | Uniform coating available without either unevenness or repellency. | 100 | 0.03 | 102 | 0.06 | 101 | 0.05 |
| | 0.12 | | 102 | 0.04 | 103 | 0.06 | 102 | 0.05 |
| Control A | 0.06 | do | 100 | 0.03 | 101 | 0.05 | 98 | 0.04 |
| | 0.12 | | 101 | 0.03 | 102 | 0.06 | 96 | 0.04 |
| Compound number: | | | | | | | | |
| 5 | 0.06 | do | 100 | 0.03 | 100 | 0.04 | 102 | 0.04 |
| | 0.12 | | 102 | 0.03 | 102 | 0.04 | 101 | 0.03 |
| 7 | 0.06 | do | 100 | 0.03 | 100 | 0.03 | 101 | 0.03 |
| | 0.12 | | 100 | 0.04 | 101 | 0.04 | 100 | 0.04 |
| 8 | 0.06 | do | 101 | 0.03 | 100 | 0.04 | 101 | 0.03 |
| | 0.12 | | 100 | 0.04 | 101 | 0.05 | 100 | 0.04 |
| 15 | 0.06 | do | 101 | 0.03 | 102 | 0.03 | 102 | 0.04 |
| | 0.12 | | 100 | 0.04 | 100 | 0.05 | 101 | 0.04 |
| 17 | 0.06 | do | 100 | 0.03 | 100 | 0.04 | 101 | 0.03 |
| | 0.12 | | 102 | 0.04 | 101 | 0.04 | 100 | 0.04 |
| 19 | 0.06 | do | 100 | 0.03 | 100 | 0.03 | 101 | 0.03 |
| | 0.12 | | 102 | 0.03 | 103 | 0.04 | 100 | 0.03 |

As apparent from the above Table 1, uniform coatings were always available according to the present invention without any fear of local incomplete coating and uneven coating.

In addition that such uniform coating is available, any adverse effect is caused on photographic characteristics. Photographic characteristics were stably maintained even under severe incubation condition.

EXAMPLE 2

High speed silver iodobromide emulsions to which 3%-aqueous solution of each of the compounds (2), (4), (6), (15), (19) and (20) had been added was coated on subbed (with vinyl maleic acid resin) surface of triacetyl cellulose film base by means of the dipping process. 2%-gelatine solution containing the respective compound as a coating aid was placed as a protective layer on the emulsion-coated surface of said film. Coating properties and photographic characteristics of the resulting films are shown in the Table 2 below. For comparison, data obtained by using saponin are also given.

or

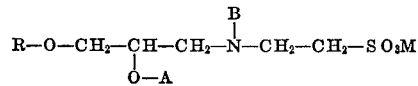

wherein R is a hydrocarbon radical having 4–8 carbon atoms or a phenyl group having a $C_{4-18}$ hydrocarbon radical, A is hydrogen or a lower acyl group, B is hydrogen or methyl and M is a cation.

2. The photographic coating composition as claimed in Claim 1, wherein said compound is used in combination with a surface active agent.

3. The photographic coating composition as claimed in claim 1, wherein said composition comprises gelatin, said coating aid compound being represented by the formula

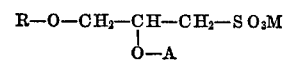

TABLE 2

| Compound added | Amount added (percent) | | Coating property | Photographic characteristics | |
|---|---|---|---|---|---|
| | Emulsion layer | Protective layer | | Relative speed | Fog |
| Saponin | 0.12 | 0.06 | Uniform coating available without either unevenness or repellency. | 100 | 0.03 |
| Compound number: | | | | | |
| 2 | 0.12 | 0.06 | do | 100 | 0.02 |
| 4 | 0.12 | 0.06 | do | 100 | 0.02 |
| 6 | 0.12 | 0.06 | do | 100 | 0.02 |
| 15 | 0.12 | 0.06 | do | 101 | 0.02 |
| 19 | 0.12 | 0.06 | do | 102 | 0.02 |
| 20 | 0.12 | 0.06 | do | 100 | 0.03 |

What is claimed is:

1. A photographic coating composition comprising 0.01–20 g. per kg. of coating composition of a coating aid compound having the formula

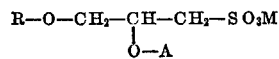

wherein R is a hydrocarbon radical having 4–18 carbon atoms or a phenyl group having a $C_{4-18}$ hydrocarbon radical, A is hydrogen or a lower acyl group and M is a cation.

4. The photographic coating composition as claimed in claim 1, wherein said composition comprises gelatin, said coating aid compound being represented by the formula

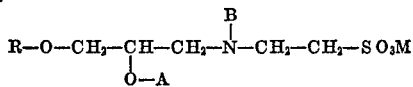

wherein R is a hydrocarbon radical having 4–18 carbon atoms or a phenyl group having a $C_{4-18}$ hydrocarbon radical, A is hydrogen or a lower acyl group, B is hydrogen or a methyl and M is a cation.

5. A composition according to claim 1 wherein said composition is a light-sensitive photographic silver halide emulsion.

6. The emulsion as claimed in Claim 5, further containing an optical sensitizer.

7. The emulsion as claimed in Claim 5, further containing a color former.

8. The emulsion as claimed in Claim 5, further containing a sulfur-, gold-, reductive or polyalkylene oxide sensitizer.

References Cited

UNITED STATES PATENTS

| | | | |
|---|---|---|---|
| 2,989,547 | 6/1961 | Whyte | 260—513 |
| 3,026,202 | 3/1962 | Knox | 96—114.5 |
| 3,084,187 | 4/1963 | Gaertner | 260—348 |
| 3,165,409 | 1/1965 | Knox | 96—114.5 |

RONALD H. SMITH, Primary Examiner

A. T. SURO PICO, Assistant Examiner

U.S. Cl. X.R.

96—108, 114.5, 120; 117—156, 164; 252—351